US012711399B2

(12) United States Patent
Pai et al.

(10) Patent No.: US 12,711,399 B2
(45) Date of Patent: Aug. 18, 2026

(54) METHODS AND SYSTEMS FOR QUANTIFYING UNCERTAINTY IN NEURAL LINK PREDICTORS FOR KNOWLEDGE GRAPHS

(71) Applicant: Accenture Global Solutions Limited, Dublin (IE)

(72) Inventors: Sumit Pai, Dublin (IE); Luca Costabello, Newbridge (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 756 days.

(21) Appl. No.: 18/136,463

(22) Filed: Apr. 19, 2023

(65) Prior Publication Data

US 2024/0354595 A1 Oct. 24, 2024

(51) Int. Cl.
*G06N 5/02* (2023.01)
*G06N 3/047* (2023.01)

(52) U.S. Cl.
CPC ............... *G06N 5/02* (2013.01); *G06N 3/047* (2023.01)

(58) Field of Classification Search
CPC ................................ G06N 5/02; G06N 3/047
See application file for complete search history.

(56) References Cited

U.S. PATENT DOCUMENTS

2022/0327356 A1* 10/2022 Rossiello .............. G06N 3/042

OTHER PUBLICATIONS

Kipf, Thomas N., and Max Welling. "Semi-supervised classification with graph convolutional networks." arXiv preprint arXiv:1609.02907 (2016). (Year: 2016).*

Gal, Yarin, and Zoubin Ghahramani. "Dropout as a bayesian approximation: Representing model uncertainty in deep learning." In international conference on machine learning, pp. 1050-1059. PMLR, 2016. (Year: 2016).*

Hamilton, William L., Rex Ying, and Jure Leskovec. "Inductive Representation Learning on Large Graphs." arXiv preprint arXiv:1706.02216 (2017). (Year: 2017).*

* cited by examiner

*Primary Examiner* — Casey R. Garner
(74) *Attorney, Agent, or Firm* — Mannava & Kang, P.C.

(57) ABSTRACT

The present disclosure describes methods and systems for quantifying certainty for a prediction based on a knowledge graph. The method includes receiving a target triple and a knowledge graph comprising a set of structured data and a set of certainty scores for the structured data; converting the target triple to an embeddings space according to neighborhood sampling by a neural network, wherein the embeddings space includes a set of point coordinates; generating a plausibility prediction for the target triple using a scoring function; repeating converting the target triple to the embedding space and generating another plausibility prediction for the target triple N times with dropouts to obtain N plausibility scores for the target triple, wherein N is an integer larger than one; generating a predicted plausibility score and a certainty score for the target triple; and outputting the predicted plausibility score and the certainty score.

17 Claims, 7 Drawing Sheets

100 receiving a target triple and a knowledge graph comprising a set of structured data and a set of certainty scores for the structured data; 110 converting the target triple to an embeddings space according to neighborhood sampling by a neural network, wherein the embeddings space includes a set of point coordinates representing the set of structured data in the embeddings space; 120 generating a plausibility prediction for the target triple using a scoring function; 130 repeating converting the target triple to the embedding space and generating another plausibility prediction for the target triple N times with dropouts to obtain N plausibility scores for the target triple, wherein N is an integer larger than one; 140 generating a predicted plausibility score and a certainty score for the target triple based on the N plausibility scores, and outputting for display the predicted plausibility score and the certainty score 150

FIG. 1

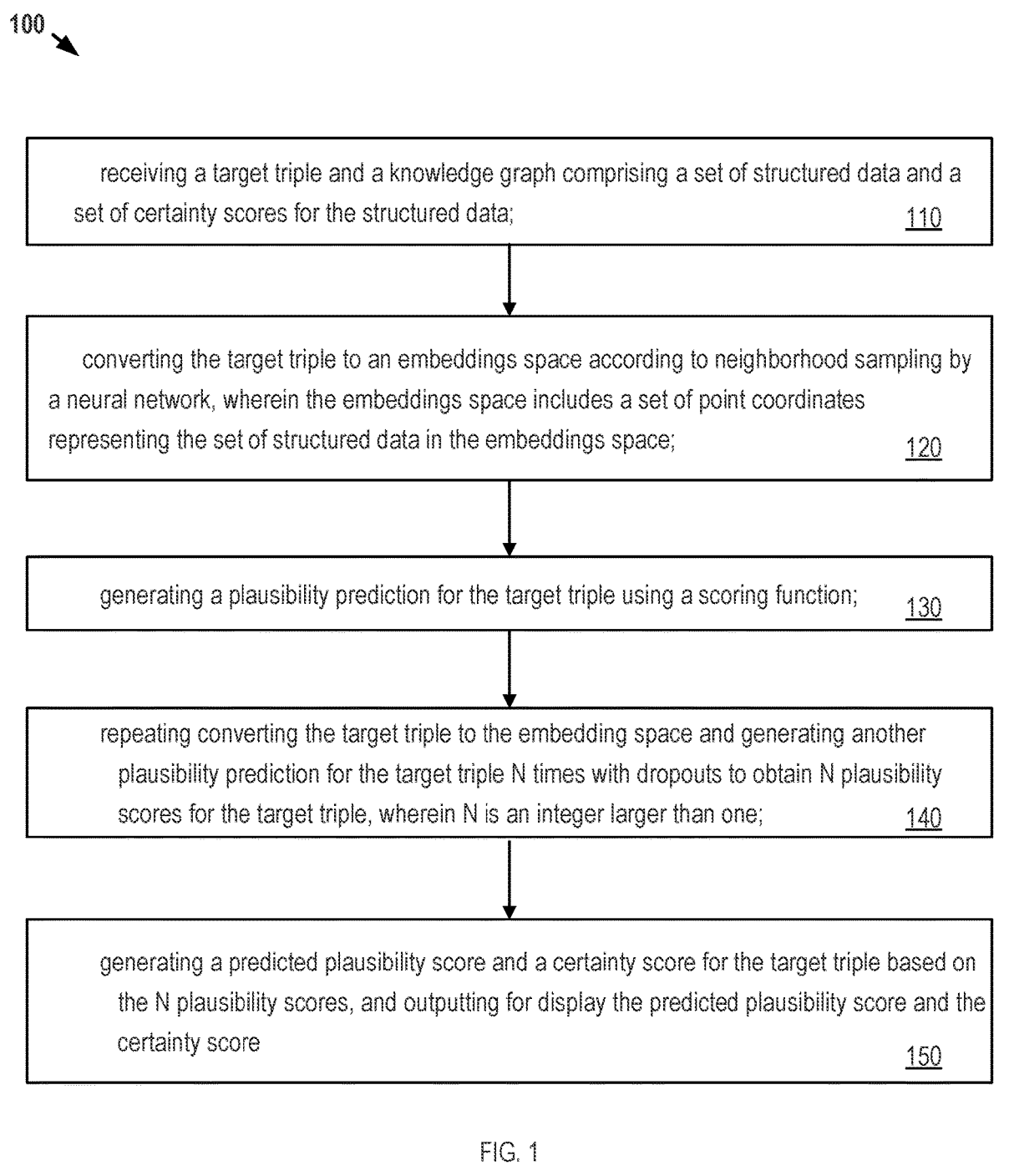

METHODS AND SYSTEMS FOR QUANTIFYING UNCERTAINTY IN NEURAL LINK PREDICTORS FOR KNOWLEDGE GRAPHS

FIELD OF THE INVENTION

The present disclosure relates in general to the fields of analyzing data elements of a knowledge graph, and predicting new facts from machine learning models applied to the knowledge graph, and in particular to methods and systems for quantifying uncertainty for machine learning models that predict missing facts in large knowledge graphs.

BACKGROUND

Data stored in a knowledge graph format is organized to reflect relations between specific concepts within the knowledge graph. Traditional approaches for discovering information from a knowledge graph have not considered solutions for discovering new facts that do not have an existing relationship within the knowledge graph.

Machine learning models may be used to provide a prediction based on an existing knowledge graph. The machine learning process supporting the prediction may be optimized and improved towards a more efficient predicting system.

SUMMARY

The present disclosure describes a computing device quantifying certainty for a prediction based on a knowledge graph. The computing device includes: a reception circuitry configured to receive a target triple and a knowledge graph comprising a set of structured data and a set of certainty scores for the structured data; a knowledge graph embedding generation circuitry configured to convert the target triple to an embeddings space according to neighborhood sampling, wherein the embeddings space includes a set of point coordinates representing the set of structured data in the embeddings space; a scoring circuitry configured to generate a plausibility prediction for the target triple using a scoring function; a control circuitry configured to repeat the acts of the knowledge graph embedding generation circuitry and the scoring circuitry N times with dropouts to obtain N plausibility scores for the target triple, wherein N is an integer larger than one; and an output circuitry configured to generate a predicted plausibility score and a certainty score for the target triple based on the N plausibility scores, and output the predicted plausibility score and the certainty score.

The present disclosure describes a method for quantifying certainty for a prediction based on a knowledge graph. The method includes receiving, by a device, a target triple and a knowledge graph comprising a set of structured data and a set of certainty scores for the structured data. The device includes a memory storing instructions and a process in communication with the memory. The method also includes converting, by the device, the target triple to an embeddings space according to neighborhood sampling by a neural network, wherein the embeddings space includes a set of point coordinates representing the set of structured data in the embeddings space; generating, by the device, a plausibility prediction for the target triple using a scoring function; repeating, by the device, converting the target triple to the embedding space and generating another plausibility prediction for the target triple N times with dropouts to obtain N plausibility scores for the target triple, wherein N is an integer larger than one; and generating, by the device, a predicted plausibility score and a certainty score for the target triple based on the N plausibility scores, and outputting predicted the plausibility score and the certainty score.

The present disclosure describes a non-transitory computer-readable storage medium storing computer-readable instructions. The computer-readable instructions, when executed by a processor, are configured to cause the processor to perform: receiving a target triple and a knowledge graph comprising a set of structured data and a set of certainty scores for the structured data; converting the target triple to an embeddings space according to neighborhood sampling by a neural network, wherein the embeddings space includes a set of point coordinates representing the set of structured data in the embeddings space; generating a plausibility prediction for the target triple using a scoring function; repeating converting the target triple to the embedding space and generating another plausibility prediction for the target triple N times with dropouts to obtain N plausibility scores for the target triple, wherein N is an integer larger than one; and generating a predicted plausibility score and a certainty score for the target triple based on the N plausibility scores, and outputting the predicted plausibility score and the certainty score.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

FIG. 1 is a flow diagram illustrating an example of a method implemented by an exemplary system, in accordance with certain embodiments of the present disclosure.

DETAILED DESCRIPTION

Figure 2:
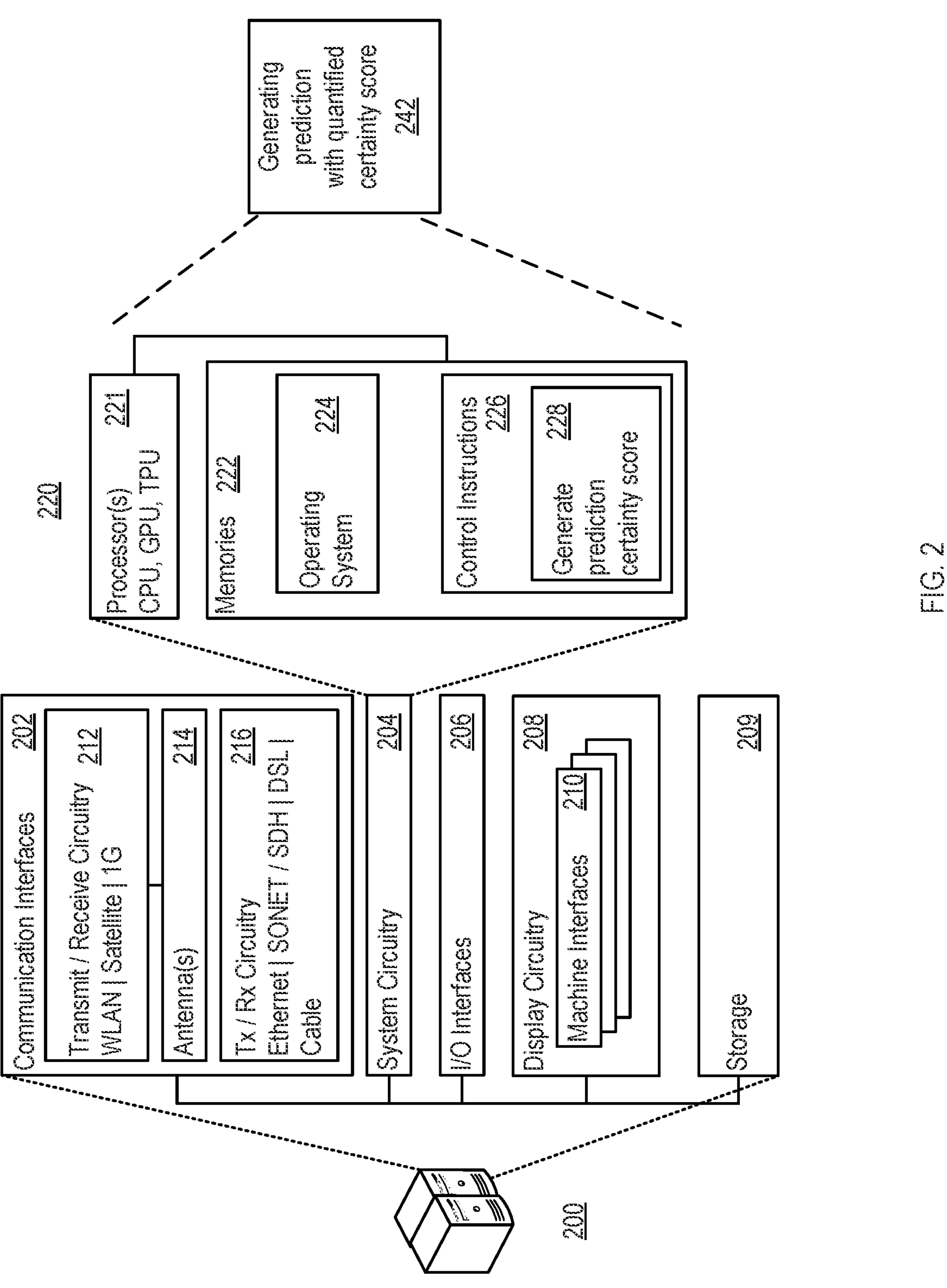
FIG. 2 is a block diagram illustrating an embodiment of a computer architecture for a device for implementing the method in FIG. 1, in accordance with certain embodiments of the present disclosure.

Reference will now be made in detail to the embodiments of the present disclosure, examples of which are illustrated in the accompanying drawings, which form a part of the present disclosure, and which show, by way of illustration, specific examples of embodiments. Please note that the disclosure may, however, be embodied in a variety of different forms and therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, application program interface (API), firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure may be embodied in various forms, including a system, a method, a computer readable medium, or a platform-as-a-service (PaaS) product for quantifying certainty (or quantifying uncertainty) for machine learning models that predict missing facts in knowledge graphs. In various examples/embodiments, the present disclosure may be applied to provide a certainty score and a certain plausibility score to a prediction, for example, the prediction may be whether a cancer patient will relapse or need a certain treatment. The certainty score may represent how certain the prediction/fact is correct, and may also indicate the degree to which a predictor considers the prediction as reliable. The plausibility score may represent how likely the prediction/fact is correct, and may also indicate a probability that the predictor considers the prediction as true.

A knowledge graph may include a set of entities and relations (links) between these entities represented as a graph. A model for a knowledge graph may be defined by a schema or layout that describes the data structures and their relationships, which may be represented by nodes and edges in the knowledge graph. The knowledge graph may present complex and innovative graphical structures that represent the relevant information in response to a query. In various embodiments, the knowledge graph may represent an underlying knowledge base via graphical representations that correspond to structured data points or entities (represented by nodes), relationships (represented by edges), and/or attributes (represented by node properties or edge properties) with semantic meaning.

The knowledge graph may include one or more graph-based datasets. The graph-based datasets may be stored in the memory and includes associations of the corresponding two nodes, for example, a graph-based dataset may include an association of the first node and the second node. In one implementation, a graph-based dataset may include data records having three parameters, which may be known as a triple: a first entity, a relation, and a second entity, and may be represented as <first entity, relation, second entity>.

In another implementation, a triple may include a subject, a predicate, and an object. The predicate represents a relationship between the subject and the object. The triple may be represented as <subject, predicate, object>. For example, a predicate "HasRelapse" may represent an association between a subject representing a "patient" and an object representing a "relapse." For another example, a predicate "therapyType" may represent an association between a subject representing a "relapse" and an object representing a "PalliativeCare." For another example, a predicate "causes" may represent an association between a subject representing a "gene" and an object representing a "disease."

Figure 3A:
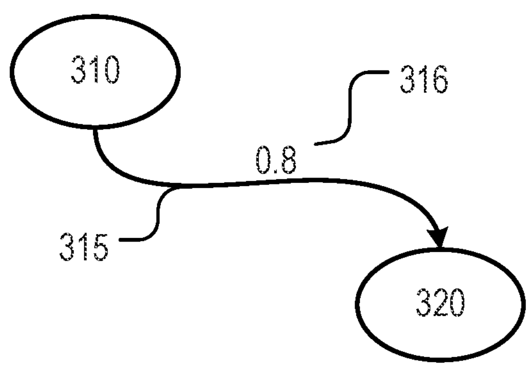
FIG. 3A is a schematic diagram illustrating a knowledge graph schema, in accordance with certain embodiments of the present disclosure.
Figure 3B:
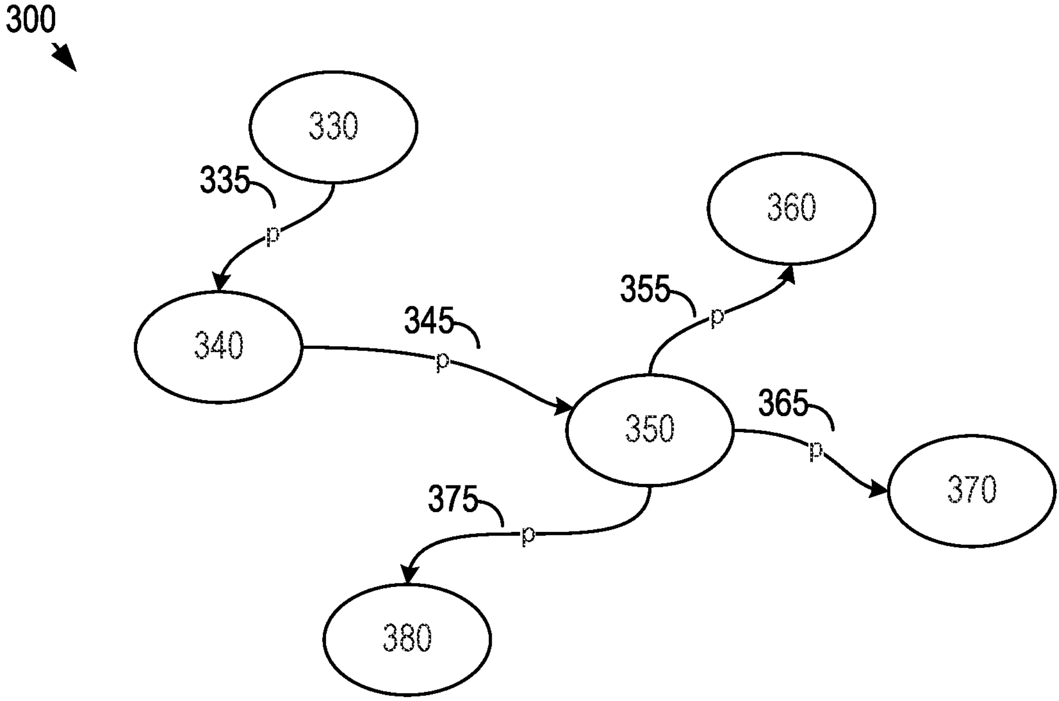
FIG. 3B is a schematic diagram illustrating a knowledge graph schema, in accordance with certain embodiments of the present disclosure.

Referring to FIG. 3A, an example of a knowledge graph may include a first node 310, a second node 320, and a link 315 between the first node 310 and the second node 320. The link 315 may be a predicate. The first and second nodes (310 and 320) may represent associated objects, respectively. The link or predicate may have a directionality pointing from the first object associated with the first node 310 to the second object associated with the second node 320. In one implementation, the nodes may be referred as entities, and/or the link may be referred as relation, predicate, or edge. Referring to FIG. 3B, another example of a knowledge graph 300 may include a plurality of nodes (330, 340, 350, 360, 370, and 380) and a plurality of links or predicates (335, 345, 355, 365, and 375) between the plurality of nodes.

In various embodiments, machine learning models may be used to predict plausibility of one or more missing link in a knowledge graph. For example, Patient1234 is a cancer patient, and machine learning models may be used to predict whether Patient1234 will relapse. In one implementation, a target triple may be created as <Patient1234, has Relapse, Relapse>, and a link predictor may output a prediction on the plausibility of the target triple. For example, a prediction may be 80%, which may mean that there is 80% probability that Patient1234 will relapse.

In some embodiments, a link predictor may include an optimized knowledge graph embeddings (KGE), which include an optimized set of vectors representing entities and links of a knowledge graph. The link predictor may receive a knowledge graph and a target triple as input, and generate a prediction as output. In some embodiments, a training step may include one or more sub-steps for the link prediction sub-system to train the system, and may take an amount of time as training time. An inference step may include one or more sub-steps for the link predictor to predict the target triple, and may take another amount of time as inference or production time.

There may be some issues/problems associated with neural link predictors when it predicts new links between nodes with plausibility scores only. For example, a neural link predictor trained on a biomedical knowledge graph may predict a score of 0.90 between a patient and a mastectomy, wherein the link between patient and mastectomy is not present in the training knowledge graph. Unfortunately, these plausibility scores (e.g. 0.90 in the example above) do not represent how certain the neural link predictor is about the prediction, but only how likely it is for the link to be factually true. In other words, some neural link predictors do not come with uncertainty estimates. This limits the adoption of neural link prediction models in decision support systems, as uncertainty estimate plays a major role in ensuring trustworthy predictions in many situations, for example but not limited to, safety-critical scenarios.

The present disclosure describes various embodiments for quantifying uncertainty (or quantifying certainty) in neural link predictors for knowledge graphs, which addresses at least one of the issues/problems discussed above. Quantified uncertainty (or quantified certainty) helps comparing the output of different link predictors. The quantified uncertainty (or quantified certainty) may provide significant added benefits. For example, one added benefit may include allowing a more informed decision by an end user (e.g., clinician) when a prediction is presented along with its certainty. Another added benefit may include generating more trustworthy predictions with quantified uncertainty (or quantified certainty), achieving better buy-in from end users. Another added benefit may include satisfying patient's right to be better informed about the prediction (e.g., general data protection regulation (GDPR)).

For one example, a neural link predictor system, which may include a neural network, may be used as clinical decision-support system to help clinicians decide if a patient should be administered a mastectomy. When the knowledge graph in the system does not include a direct link between Patient 10 and a mastectomy, and the system returns a prediction of the link that "Patient10 is 90% likely to be associated to mastectomy, with an estimated confidence of 30%", that means the system suggests to go ahead with surgery, but it also flags that such prediction has a relatively low confidence/certainty. Thus, the clinician may better inform the patient about the condition, and/or may decide to trust or not to trust such output. Quantified uncertainty (or quantified certainty) makes the human decision process more informed.

Quantifying uncertainty may gauge the boundaries of the predicted score, such as the below:

$$(Patient_{10}, undergoesProcedure, \text{Mastectomy}) = 0.90 \pm ?.$$

For another example with respect to quantified uncertainty (or quantified certainty) helping with comparing the output of different link predictors, a first link predictor may have a prediction output for a target triple as 0.90±0.10, such as the below:

$$(Patient_{10}, undergoesProcedure, \text{Mastectomy}) = 0.90 \pm 0.10;$$

and a second link predictor may have a prediction output for the same target triple as 0.90±0.03, such as the below:

$$(Patient_{10}, undergoesProcedure, \text{Mastectomy}) = 0.90 \pm 0.03.$$

Since the prediction of the first link predictor (0.10) is less certain (i.e., more uncertain) than the prediction of the second link predictor (0.03), the second link predictor may be preferred over the first predictor. Without certainty estimates, it's difficult to tell which link predictor is preferred because, without certainty estimates, the output of the two link predictors would appear the same as 0.90.

Referring to FIG. 3A, a parameter 316 may be a value of 0.8, as a certainty score representing data uncertainty (or certainty) for a triple in a knowledge graph. As shown in FIG. 3B, a knowledge graph-based dataset may include data records having an additional fourth parameter (p), such as a certainty score/parameter. In some implementations, a knowledge graph comprising one or more certainty score may be referred as an uncertain knowledge graph, and may be used to train a neural link predictor system for generating quantified uncertainty (or quantified certainty) associated with a prediction.

The present disclosure describes various embodiments of methods for quantifying certainty for a prediction based on a knowledge graph. Referring to FIG. 1, a method 100 may include a portion or all of the following: step 110: receiving a target triple and a knowledge graph comprising a set of structured data and a set of certainty scores for the structured data; step 120: converting the target triple to an embeddings space according to neighborhood sampling by a neural network, wherein the embeddings space includes a set of point coordinates representing the set of structured data in the embeddings space; step 130: generating a plausibility prediction for the target triple using a scoring function; step 140: repeating converting the target triple to the embedding space and generating another plausibility prediction for the target triple N times with dropouts to obtain N plausibility scores for the target triple, wherein N is an integer larger than one; and/or step 150: generating a predicted plausibility score and a certainty score for the target triple based on the N plausibility scores, and outputting for display the predicted plausibility score and the certainty score.

FIG. 2 shows an example execution circuitry (or a device) for implementing the method 100. In one implementation, the execution circuitry may include a computer system 200 for implementing the method 100. In another implementation, the execution circuitry may include a distributed system including more than one computer systems each of which may include a portion or all of the components as the computer system 200 in FIG. 2.

Referring to FIG. 2, the execution circuitry 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CD ROM or DVD drive), serial and parallel bus interfaces, and keyboard and mouse interfaces. The display circuitry 208 may include man-machine interfaces and/or graphical user interfaces (GUI). The GUI may be used to present interfaces and/or options to facilitate model management and/or the execution of other tasks.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol. Additionally or alternatively, the communication interface 202 may support secure information exchanges, such as secure socket layer (SSL) or public-key encryption-based protocols for sending and receiving private data.

The storage 209 may be used to store various initial, intermediate, or final data or model for implementing the method 100 in FIG. 1. These data corpus may alternatively be stored in a database. In one implementation, the storage 209 of the computer system 200 may be integral with the database. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

The system circuitry 204 may support tasks described in the present disclosure, including the drawings and/or claims. In one example, the system circuitry 204 may be implemented as processing circuitry 220 for implementing generating prediction with quantified certainty scores 242, which may provide software support to implement the various tasks performed in the method 100 of FIG. 1. The processing circuitry 220 may include one or more processors 221 and one or more memories 222. The one or more processors 221 may include a portion or all of the following: one or more central processing unit (CPU), one or more graphics processing unit (GPU), and/or one or more tensor processing unit (TPU). The memories 222 stores, for example, control instructions 226 and an operating system 224. The control instructions 226, for example may include instructions for implementing the task of predicting node-to-node links with certainty scores in knowledge graphs 228. In one implementation, the one or more processors 221 execute the control instructions 226 and the operating system 224 to carry out any desired functionality described in the present disclosure. In another implementation, the one or more processors 221 may include a CPU and multiple GPU/TPU to perform one or more steps in method 100.

Referring to FIG. 2, the memories 222 may further include applications and structures, for example, coded objects, templates, or one or more other data structures to facilitate model management and/or the execution of other tasks.

Figure 4:
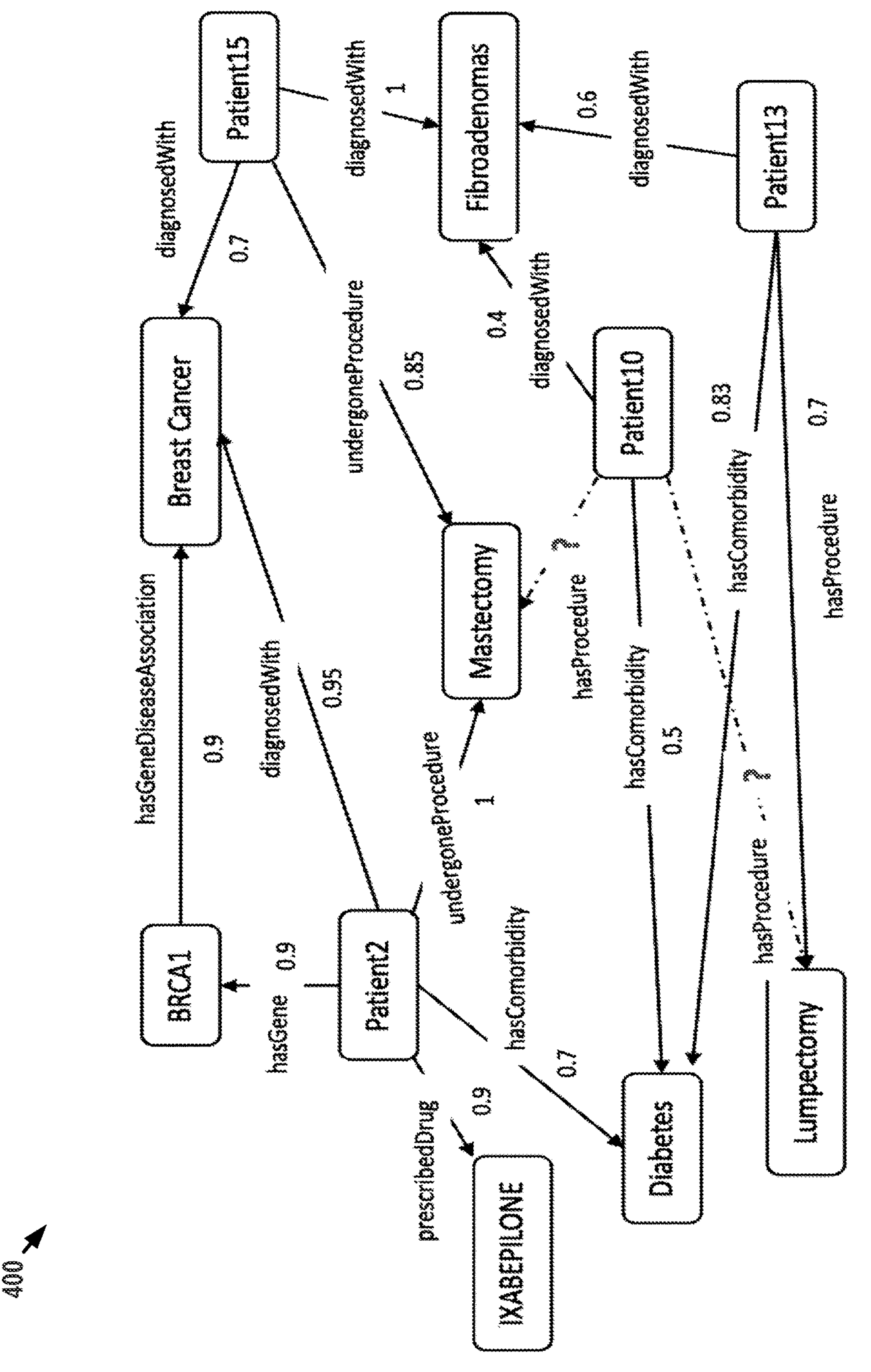
FIG. 4 is an example of a knowledge graph, in accordance with certain embodiments of the present disclosure.

Referring to FIG. 4, in one implementation, as a non-limiting example, an uncertain knowledge graph schema 400 is described in accordance with various embodiments of the present disclosure. The schema may provide a manner to express statements about the resources or knowledge base using specific properties that describe the knowledge base. The uncertain knowledge graph 400 is from a decision support system to predict whether a patient needs to undergo a certain medical procedure. To represent data uncertainty in the knowledge graph, each triple is assigned a numeric attribute (w) as a certainty score, leading to G={t=(s, p, o, w)}. The certainty score (w) may be a value between 0 and 1, inclusive. For example, for t=("BRCA1", hasGeneDiseaseAssociation, "Breast Cancer", 0.9), BRCA1 is a gene, "Breast Cancer" is a condition, and 0.9 is how certain the fact is, on a scale of [0, 1]. A numeric attribute close to one means the fact is almost certain, whereas a value close to 0 means the fact is most likely not factually correct. In the knowledge graph 400, one or more links with question mark ("?") represented by dashed-lines are hypothetical and are the target triples of graph machine learning predictions.

Figure 5:
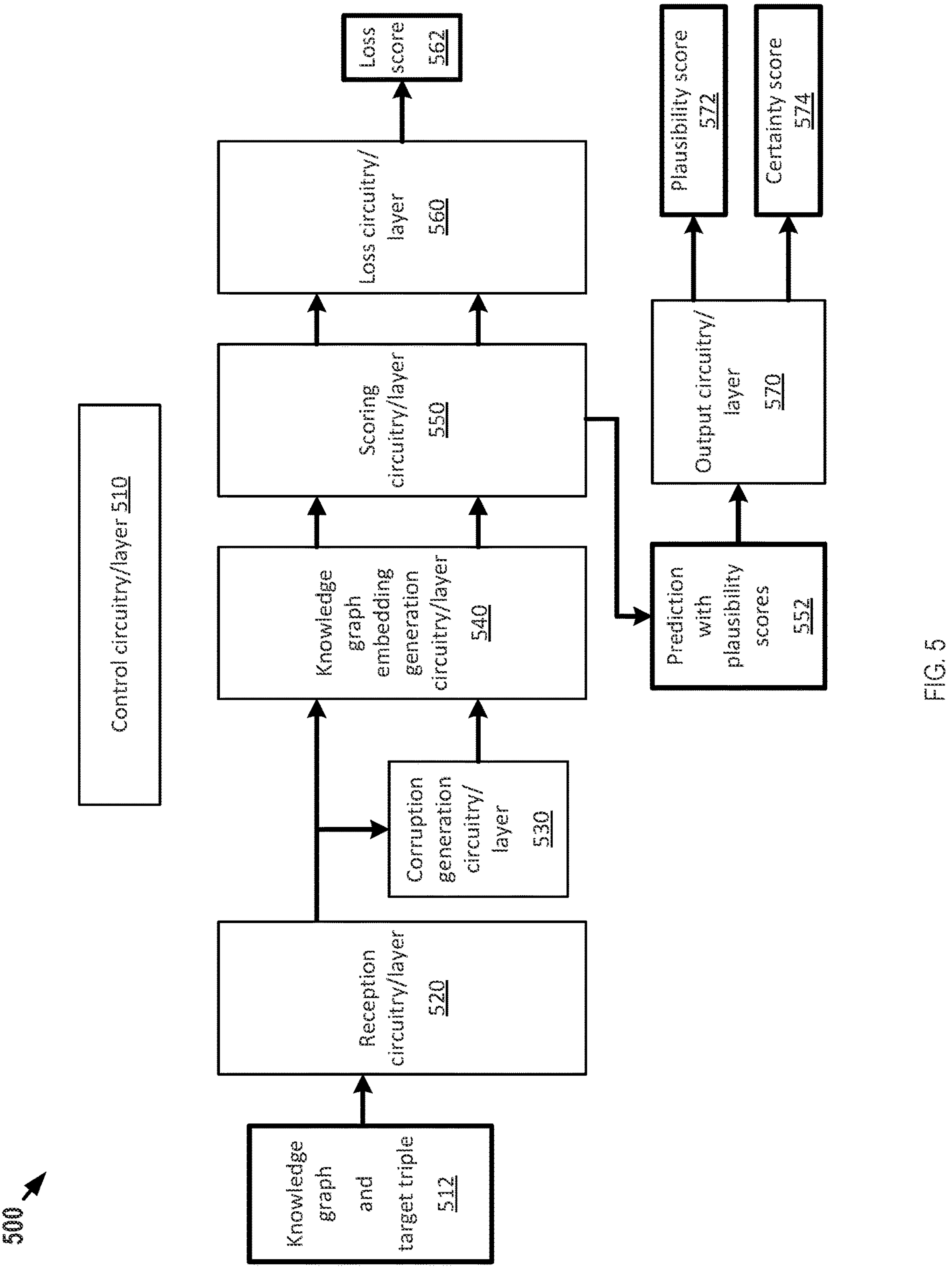
FIG. 5 is a block diagram illustrating an exemplary embodiment of a system, in accordance with certain embodiments of the present disclosure.

FIG. 5 shows a schematic diagram for various embodiments in the present disclosure. A system 500 may include a portion or all of the following to perform related functions/steps: a control circuitry 510, a reception circuitry 520, a corruption generation circuitry 530, a knowledge graph embedding generation circuitry 540, a scoring circuitry 550, a loss circuitry 560, and/or an output circuitry 570.

Referring to step 110 in the method 100, the reception circuitry 520 is configured to receive a target triple and a knowledge graph 512. The knowledge graph may include a set of structured data and a set of certainty scores for the structured data. The reception circuitry may include a portion or all of the execution circuitry 200 in FIG. 2, including a memory storing instructions and a processor in communication with the memory. The knowledge graph includes a set of triples including predicates between first nodes and second nodes, and the first and second nodes represent associated objects. The target triple includes a triple to assess for plausibility.

For one example, the knowledge graph may include a portion or all of the knowledge graph 400 in FIG. 4, and/or the target triple may include a triple of <Patient10, HasProcedure, Mastectomy> as shown in dashed line in FIG. 4.

Referring to step 120 in the method 100, the knowledge graph embedding generation circuitry 540 is configured to convert the target triple to an embeddings space according to neighborhood sampling, wherein the embeddings space includes a set of point coordinates representing the set of structured data in the embeddings space. The knowledge graph embedding circuitry may include a portion or all of the execution circuitry 200 in FIG. 2, including a memory storing instructions and a processor in communication with the memory.

In some implementations, when the knowledge graph embedding generation circuitry is configured to convert the target triple to the embeddings space according to the neighborhood sampling, the knowledge graph embedding generation circuitry is configured to do a portion or all of the following: select K neighboring nodes of the target triple based on certainty scores of the neighboring nodes, wherein K is an integer larger than one; generate an embedding vector for each of the K neighboring nodes by an encoder circuitry; and/or aggregate the K embedding vectors to obtain an aggregated embedding vector for the target triple.

In some implementations, the encoder circuitry in the knowledge graph embedding generation circuitry comprises a neural network with dropouts after every weight layer.

In some implementations, when the knowledge graph embedding generation circuitry is configured to select the K neighboring nodes of the target triple based on certainty scores of the neighboring nodes, the knowledge graph embedding generation circuitry is configured to sample the neighboring nodes of the target triple according to a sampling with replacement algorithm to obtain the K neighboring nodes with highest certainty scores. The sampling with replacement algorithm may be used in the condition where each individual item that is selected from a sample set is returned to a population before the next individual is selected, which may ensure that the probability of selecting any specific individual item remains constant.

In some implementations, when the knowledge graph embedding generation circuitry is configured to aggregate the K embedding vectors to obtain the aggregated embedding vector for the target triple: the knowledge graph embedding generation circuitry is configured to use one of the following methods: each point coordinate of the aggregate embedding vector being a summary of corresponding point coordinate of the K embedding vectors, each point coordinate of the aggregate embedding vector being an average of corresponding point coordinate of the K embedding vectors, or each point coordinate of the aggregate embedding vector being a weighted average of corresponding point coordinate of the K embedding vectors.

Figure 6:
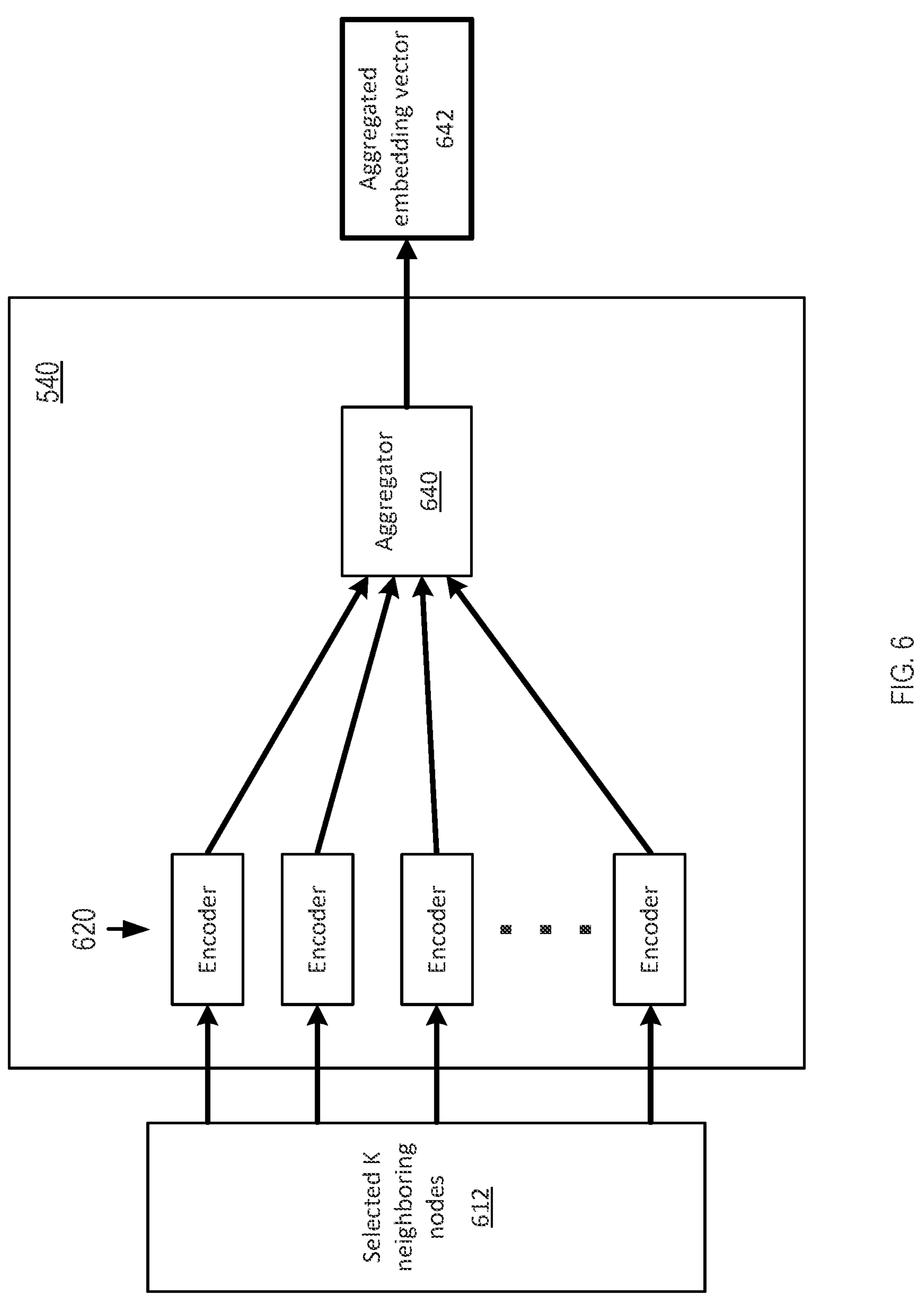
FIG. 6 shows a block diagram illustrating an exemplary embodiment of a portion of the system in FIG. 5, in accordance with certain embodiments of the present disclosure.

FIG. 6 shows a non-limiting example of the knowledge graph embedding generation circuitry/layer, which may include an encoder circuitry/layer (620) and an aggregator (640). For example during training, the embeddings for the subject(s) and object (o) of the triple are obtained for each triple in the uncertain knowledge graph returned by the input/reception layer. For a target node in the triple (for example, subject or object), the neighborhood of the target node includes the set of triples directly connected to the node. For example, when the processed triple is <Patient2, prescribedDrug, Ixabepilone> and the target node is "Patient2" (see FIG. 4), the target node may be sufficiently well represented by some of its neighbors. Note each triple in the neighborhood is associated with a numeric value that quantifies the link certainty. Based on these numeric certainty values, the K most certain neighbors of the target node are selected. In some implementations, sampling with replacement is used, which leads to selecting the lowest-uncertainty neighbors. K may be a positive integer, for example, 2, 5, 7, or 15. A tokenization procedure may be performed to generate a representation of the node's neighbors.

For a non-limiting example, when the target node is "Patient2" (see FIG. 4), neighboring nodes of the target node, sorted from high certainty value to low certainty value, includes: Mastectomy (with certainty value of 1), Breast Cancer (with certainty value of 0.95), BRCA1 and IXABEPILONE (both with certainty value of 0.9, and their orders may be determined randomly or based on a predefined tie-breaker rule), and Diabetes (with certainty value of 0.7). Thus, when K=2, the Mastectomy (with certainty value of 1) and Breast Cancer (with certainty value of 0.95) may be selected to be fed into the encoder layer. When K=4, Mastectomy (with certainty value of 1), Breast Cancer (with certainty value of 0.95), BRCA1, and IXABEPILONE (both with certainty value of 0.9) may be selected to be fed into the encoder layer. When K=5, Mastectomy (with certainty value of 1), Breast Cancer (with certainty value of 0.95), BRCA1 and IXABEPILONE (both with certainty value of 0.9), and Diabetes (with certainty value of 0.7) may be selected to be fed into the encoder layer.

In some implementation, K may be a non-fixed integer, i.e., having a dynamic value, for example, being dynamically equal to a number of neighboring nodes that have certainty values above a threshold. For example, when K is a dynamic value and the threshold is 0.8, Mastectomy (with certainty value of 1), Breast Cancer (with certainty value of 0.95), BRCA1, and IXABEPILONE (both with certainty value of 0.9) may be selected to be fed into the encoder layer, so that an effective value of K is 4 for the target node "Patient2". When K is a dynamic value and the threshold is 0.5, Mastectomy (with certainty value of 1), Breast Cancer (with certainty value of 0.95), BRCA1 and IXABEPILONE (both with certainty value of 0.9), and Diabetes (with certainty value of 0.7) may be selected to be fed into the encoder layer, so that an effective value for K is 5 for the target node "Patient2".

The representations of the K sampled neighboring entities may be fed into the encoder circuitry/layer to generate their respective embedding vectors. The encoder circuit/layer may include K encoders which share their weights, and the encoders may be implemented as multi-layer perceptrons, or other neural network architectures. The output of the encoders represents the embeddings of the sampled neighbor entities. These embeddings are then fed into the aggregator to be aggregated to generate the embedding vector of the target node. The aggregator may use mean, sum, or any other aggregation approach. In some implementations, the encoder circuitry/layer may include a neural network with dropouts after every weight layer, for a non-limiting example, a Monte Carlo dropout method.

Referring back to FIG. 5 and/or referring to step 130 in the method 100, the scoring circuitry 550 is configured to generate a plausibility prediction for the target triple using a scoring function. The scoring circuitry may include a portion or all of the execution circuitry 200 in FIG. 2, including a memory storing instructions and a processor in communication with the memory. The scoring circuitry may take in the embeddings of the target triple and score it using a scoring function. The higher the score is, the higher the chances the triple is factually correct. The scoring layer can be considered as a way to assign a plausibility score to each fact of the knowledge graph. During training, the scoring circuitry may take in the embeddings of the positive triple and its corruptions (synthetic negatives) and scores them using a scoring function. The scoring function computes a similarity between the embedding of the subject translated by the embedding of the predicate and the embedding of the object. In some implementations, this is computed by using the L2 norm (Euclidean distance). The scoring algorithm may include one or more of TransE, RESCAL, HolE, DistMult, ComplEx, and/or ConvE, for example, TransE relies on distances, DistMult and ComplEx are bilinear-diagonal models, HolE uses circular correlation.

Referring to step 140 in the method 100, the control circuitry 510 is configured to repeat the knowledge graph embedding generation circuitry and scoring circuitry N times with dropouts to obtain N plausibility scores 552 for the target triple, wherein N is an integer larger than one. The control circuitry may include a portion or all of the execution circuitry 200 in FIG. 2, including a memory storing instructions and a processor in communication with the memory. The plausibility score generation performed by the knowledge graph embedding generation circuitry and scoring circuitry may be repeated N times with keeping the dropouts active (e.g., Monte Carlo dropout method). Depending on both data and model uncertainty, each time when the embedding of the target node is generated, embedding weights may slightly change (since dropouts are active and/or the node representation may vary each time due to the stochasticity in input sampling from the uncertain knowledge graph neighborhood). Slightly different embeddings result in a change of predicted scores for the target triple. Thus, after repeating this procedure N times, N plausibility scores are obtained.

Referring to step 150 in the method 100, the output circuitry 570 is configured to generate a predicted plausibility score 572 and a certainty score 574 for the target triple, and output the predicted plausibility score and the certainty score. The output circuitry may include a portion or all of the execution circuitry 200 in FIG. 2, including a memory storing instructions and a processor in communication with the memory. In some implementations, when the output circuitry is configured to generate the predicted plausibility score and the certainty score for the target triple and output the predicted plausibility score and the certainty score, the output circuitry is configured to: calculate a mean and a standard deviation based on the obtained N plausibility scores for the target triple; determine the mean to represent the predicted plausibility score; use the standard deviation to determine the certainty score; and output the predicted plausibility score and the certainty score for the target triple.

In some implementations, a value of standard deviation (std) may be negatively correlated to the certainty score, for example, a smaller value of standard deviation indicating a higher certainty score. For one example, the certainty score may be calculated as (1−std).

The corruption generation circuitry 530 is configured to generate synthetic negatives corresponding to each triple of a subset in the knowledge graph. The corruption generation circuitry may include a portion or all of the execution circuitry 200 in FIG. 2, including a memory storing instructions and a processor in communication with the memory. The corruption generation circuitry/layer takes the input triple and generates "corruptions" by randomly replacing either the subject or object with a random entity from the knowledge graph. Corruptions (also known as "synthetic negatives") are required to train the neural link predictor model. In some implementations, a corruption heuristics typically generates negative triples (i.e. "synthetic negatives") by replacing either the subject or the object of a triple, to create implausible facts.

In some implementations, for example during training, the scoring circuitry is configured to generate a positive score for the triple and to generate negative scores for the synthetic negatives using the scoring function.

The loss circuitry 560 is configured to calculate a loss score according to a loss function based on scoring the triple in the knowledge graph and the synthetic negatives. The corruption generation circuitry may include a portion or all of the execution circuitry 200 in FIG. 2, including a memory storing instructions and a processor in communication with the memory. In some implementations, when the loss circuitry is configured to calculate the loss score, the loss circuitry is configured to calculate the loss score based on the positive score for the triple and the negative scores for the synthetic negatives. For a non-limiting example, the loss layer/circuitry may use a pairwise margin-based loss function according to a scoring function based on positive and negative triples.

In some embodiments, the control circuitry is configured to train the knowledge graph embedding generation circuitry based on the loss score corresponding to the subset. In some implementations, the system may minimize the loss score calculated by the loss layer with the scoring layer, i.e. a function that assigns a plausibility score to a triple t=(sub, pred, obj). The goal of such optimization procedure is learning optimal embeddings, so that the scoring function is able to assign high scores to factually correct facts and low scores to triples unlikely to be true. When the loss score is below a certain threshold or when a change of the loss scores between runs is below a certain threshold, the control circuitry may determine that the training is done and determine to exit the training.

In some implementations, the step 120 of the method 100 may include selecting K neighboring nodes of the target triple based on certainty scores of the neighboring nodes, wherein K is an integer larger than one; generating an embedding vector for each of the K neighboring nodes by an encoder; and/or aggregating the K embedding vectors to obtain an aggregated embedding vector for the target triple.

In some implementations, the selecting the K neighboring nodes of the target triple based on certainty scores of the neighboring nodes may include sampling the neighboring nodes of the target triple according to a sampling with replacement algorithm to obtain the K neighboring nodes with highest certainty scores.

In some implementations, the encoder in the knowledge graph embedding generation circuitry comprises a neural network with dropouts after every weight layer.

In some implementations, the aggregating the K embedding vectors to obtain the aggregated embedding vector for the target triple may include: each point coordinate of the aggregate embedding vector being a summary of corresponding point coordinate of the K embedding vectors, each point coordinate of the aggregate embedding vector being an average of corresponding point coordinate of the K embedding vectors, or each point coordinate of the aggregate embedding vector being a weighted average of corresponding point coordinate of the K embedding vectors.

In some implementations, the step 130 of the method 100 may include calculating a mean and a standard deviation based on the obtained N plausibility scores for the target triple; determining the mean to represent the plausibility score and the certainty score based on the standard deviation; and outputting the plausibility score and the certainty score for the target triple.

In some implementations, the method 100 may include training the neural network for converting the target triple to the embeddings space, which may include, for each triple in a subset of the knowledge graph: generating synthetic negatives corresponding to the triple, and calculating a loss score according to a loss function based on scoring the triple and the synthetic negatives; and training the neural network based on the loss score.

In some implementations, the method may further include generating a positive score for the triple and to generate negative scores for the synthetic negatives using the scoring function. In some implementations, the calculating the loss score may include calculating the loss score based on the positive score for the triple and the negative scores for the synthetic negatives.

Figure 7:
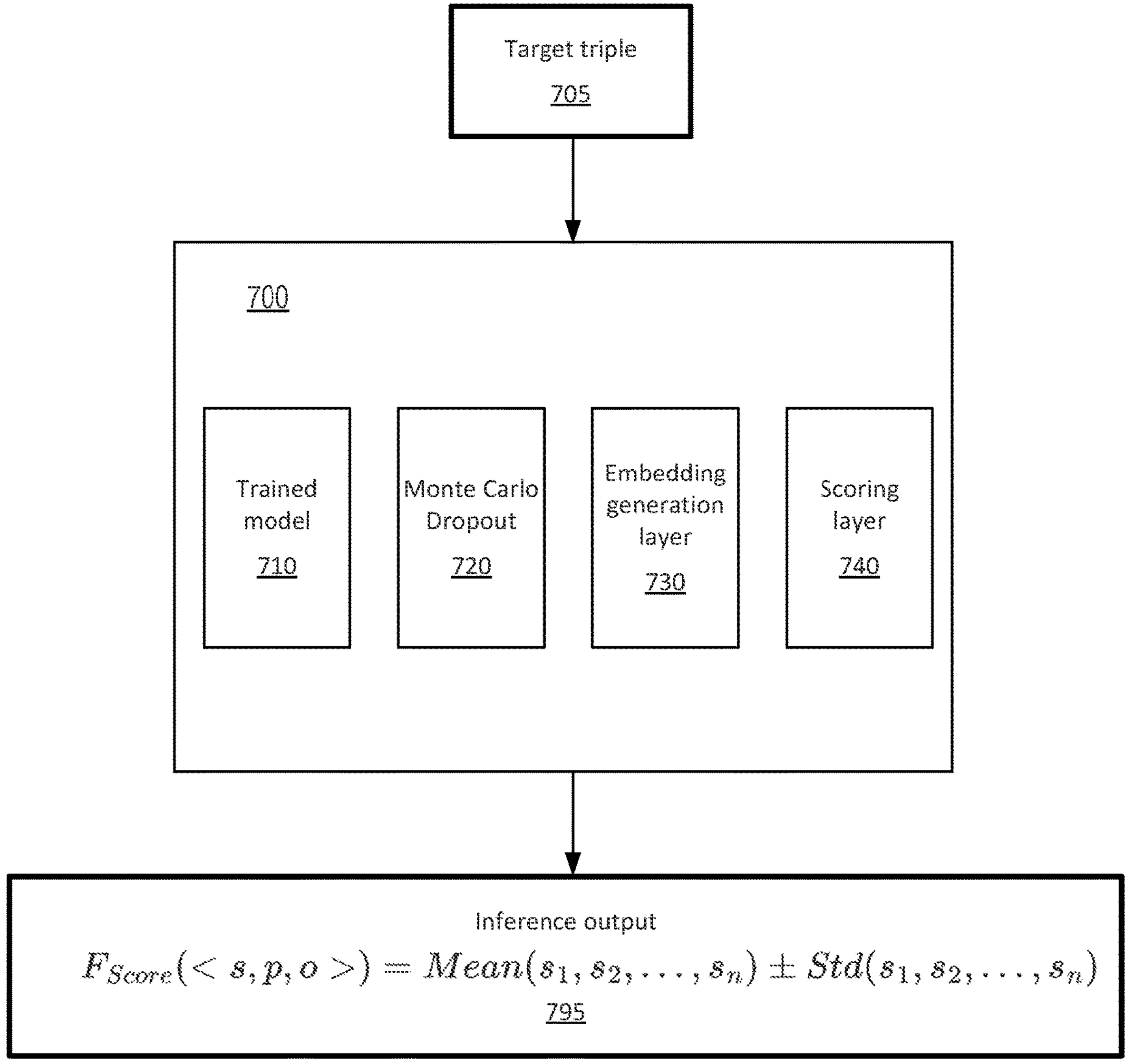
FIG. 7 is a block diagram illustrating another exemplary embodiment in the present disclosure.

The present disclosure describes a neural link predictor capable of providing a quantified certainty score as well as a quantified plausibility score for a target triple prediction. FIG. 7 shows a block diagram of a neural link predictor 700, which includes a portion or all of the following: a trained model 710 using a Monte Carlo dropout method 720, an embedding generation layer 730, and/or a scoring layer 740, which may be any embodiment/implementation as described in the present disclosure. The neural link predictor 700 takes a unknown target triple 705 as input and may generate an inference as output with a plausibility score and a certainty score 795.

For various embodiments, the present disclosure includes the following non-limiting examples and descriptions.

Knowledge graph (KG) may refer to a graph dataset made of directed, label edges that connects nodes representing concepts (e.g. patients, medical conditions, genes, proteins, etc). Two nodes can be connected by multiple edges with distinct labels. This means knowledge graphs are "multi-relational graphs" Knowledge graphs are one of the methods to represent biomedical knowledge bases.

Triple may be also known as "fact" or "link", for example, t=(s, p, o), where s is the "subject", p the "predicate", and "o" the object.

Graph machine learning may include a family of machine learning methods designed to learn from graph datasets with the goal of inferring missing information (typically this means predicting missing edges between nodes of a graph). Graph machine learning includes node representation learning models based on graph features, graph neural networks (GNN), and Neural Link predictors.

Neural link predictor may be also known as knowledge graph embedding model (KGE), which is an artificial neural network architecture that learns vector representations ("embeddings") of concepts from a training knowledge graph to predict missing, unseen links between nodes. In some implementations, a neural link predictor may be referred as "the model".

An exemplary architecture of a neural link predictor may include the following.

Input Layer: The KG is fed to the model at this layer in the form of triple. Each triple is represented as <s, p, o>, where s and o are subject and object entities, p is the predicate.

Corruption Generation Layer: This layer takes the input triple and generates "corruptions" by randomly replacing either the subject or object with a random entity from the graph. Corruptions (also known as "synthetic negatives") are needed to train the neural link predictor model. A corruption heuristic typically generates negative triples (i.e. "synthetic negatives") by replacing either the subject or the object of a triple, to create implausible facts.

Embedding: an embedding may be a k-dimensional vector of real numbers that represents either a node (e.g. "Mastectomy" in FIG. 4) or an edge type (e.g., "hasComorbidity" in FIG. 4). Embeddings are learned by artificial neural networks and serve as their internal representation for the concept learned from the input knowledge graph. Embeddings learned by neural link predictors typically have dimensionality 100<k<500 (which means they are arrays of 100-500 real numbers). Embeddings are the model weights learned by the neural link predictor, i.e. its learned parameters.

Embedding Lookup Layer: this layer looks up the embeddings of the entities and predicates of the triple and corruptions.

Scoring Layer: this layer takes in the embeddings of the positive triple and its corruptions and scores it using scoring functions. The higher the score, the higher the chances the triple is factually correct. The scoring layer can be considered as a way to assign a plausibility score to each fact of the knowledge graph.

Loss Layer: this layer uses the scores of the positive triple and their corruptions and computes the loss.

Link Prediction Task: the task of inferring if a new link t'=(s', p', o') between two nodes of the training knowledge graph is factually correct. Neural link predictors carry out such prediction by combining the embeddings of s', p' and o' to return a probability p that t' is correct.

Uncertainty in neural networks: known as the "confidence" or "uncertainty" of the model output, it is a numeric value that indicates the degree to which a machine learning model considers a prediction as reliable. The adoption of decision-support systems based on artificial neural networks in safety-critical use cases is limited by factors that derive from uncertainty. For example, it is important to be aware of the uncertainty of a system based on artificial neural network, so that in case of very uncertain automatic predictions, end users can ignore and override the output of the neural network.

Uncertainty includes two components: data uncertainty, also known as Aleatoric Uncertainty, which is not reducible as it depends on the input data used to train the machine learning system; and model uncertainty, also known as Epistemic Uncertainty, which indicates the component of uncertainty determined by the neural network architecture. Model uncertainty may be reduced by enhancing how a neural network learns its weights (i.e. the "learned parameters") during training.

Uncertainty estimate for neural networks: quantifying the uncertainty of the output of machine learning models implemented with artificial neural networks may include the following approaches to estimate uncertainty: Bayesian neural networks, ensemble methods, test-time augmentation methods, or single network deterministic methods.

Dropout is a regularization technique that may be used to prevent overfitting. It effectively drops out large parts of neurons during training. This is equivalent to training multiple configurations of neural networks for same input. Using dropouts during training improves the generalization capability of a neural network. Dropouts may be kept active at inference time with doing multiple forward passes on same input, resulting in changing network outputs. The results of the multiple forward passes may be aggregated to compute the confidence of the network over the changing model weights.

Uncertain Knowledge Graphs to represent data uncertainty in a knowledge graph, each triple is assigned a numeric attribute (see FIG. 4).

In some embodiments, a system designed as a neural link predictor is implemented as an artificial neural network that undergoes two major steps: a training step, during which the system is fed with an uncertain knowledge graph which is used to learn optimal node and edge embeddings (i.e. to obtain the "trained model"); an inference step, wherein, using the embeddings learned during training (i.e. the "trained model"), the system infers the plausibility score of unseen links and estimate how uncertain it is.

For the training step in some embodiments, a system of a neural link predictor is trained to be able to estimate the uncertainty of each prediction, with taking into account both data and model uncertainty. The training procedure may include a portion or all of the following. An input layer reads the input uncertain knowledge graph from storage and feeds it to the rest of the pipeline. Data uncertainty is taken into account by modelling input data as an uncertain knowledge graph. Facts uncertainty is encoded by numeric values in the [0,1] range. The system then minimizes a loss layer that together with a scoring layer, i.e. a function that assigns a plausibility score to a triple t=(sub, pred, obj). The goal of such optimization procedure is learning optimal embeddings, so that the scoring function is able to assign high scores to factually correct facts and low scores to triples unlikely to be true. For an non-limiting example, the scoring layer of TransE computes a similarity between the embedding of the subject translated by the embedding of the predicate and the embedding of the object by the following equation:

$$f_{TransE} = -\|e_s + e_p - e_o\|_2$$

wherein $\|\bullet\|$ represents the L2 norm (Euclidean distance). The scoring layer is then used on positive and negative triples in the loss layer, for non-limiting example, a pairwise margin-based loss, by the following equation:

$$\mathcal{L}(\theta) = \sum_{t^+ \in G} \sum_{t^- \in N} \max(0, [\gamma + f_m(t^-; \theta) - f_m(t^+; \theta)])$$

where Θ are the embeddings learned by the model, $f_m$ is the model-specific scoring function, $\gamma \in \mathbb{R}$ is the margin, and $\mathcal{N}$ is a set of negative triples generated with a corruption heuristic. The corruption generation layer takes an input triple and generates "corruptions" by randomly replacing either the subject or object with a random entity from the graph. Corruptions (also known as "synthetic negatives") are required to show the neural link predictor examples of facts unlikely to be true.

Beside modelling facts uncertainty as numeric values on edges of the input knowledge graph, to support predictions which are aware of data uncertainty, an improved embedding generation layer replaces the embedding lookup step of a conventional neural link predictor. This component generates node embeddings aware of the data uncertainty modelled in the uncertain knowledge graph, wherein the embedding generation layer samples k nodes based on the numeric values of each neighboring link, and then tokenizes the sampled nodes and passes them to an encoder that includes dropouts after every internal layer, and then the neighborhood embeddings are aggregated to obtain the target node embedding.

For an example, when the target node is "Patient2" in FIG. 4, the neighborhood of the target node, i.e. the set of triples directly connected to the node "Patient2" are sampled, and based on these numeric values, the k most certain neighbors of the target node are selected. A tokenization procedure is performed and the representations of the k sampled neighboring entities are passed to k encoders which share their weights. The output of the encoders represents the embeddings of the sampled neighbor entities. These embeddings are then aggregated using mean, sum, or any other aggregation approach to creates the embedding of the target node.

The embedding for the predicate p is obtained with a conventional lookup carried out within the embedding generation layer, which may not undergo the neighborhood-aware procedure.

Following the above training procedure, a trained model is obtained, whose node embeddings capture the data uncertainty modelled in the uncertain knowledge graph. The neural link predictor is trained with dropout (e.g., Monte Carlo dropout) for every layer, which is needed at inference time to estimate model uncertainty using Monte Carlo dropout.

For the inference step in some embodiments, the system having the trained neural link predictor can be used to predict how likely a missing link is to be factually correct, and how certain the system is on such prediction. To generate embeddings for the entities of the target triple ("Patient10" and "Mastectomy"), the neighborhood sampling procedure described above during the training step is used, and the scoring layer is used to score the target triple. This process repeats N times instead of doing once, and the dropouts is kept active during the repeat (e.g., Monte Carlo dropout). Depending on both data and model uncertainty, each time when the embedding of a target node is generated, embedding weights may slightly change, since dropouts are active and the node representation may vary each time due to the stochasticity in input sampling from the uncertain graph neighborhood. Slightly different embeddings each time result in a change of predicted scores for the target triple. The n-time repeats of this procedure result in n plausibility scores $s_1, s_2, \ldots s_n$ as below:

$$F_{Score}\left(e^1_{Patient_{10}}, e_{undergoseProcedure}, e^1_{Mastectomy}\right) = s_1$$

$$F_{Score}\left(e^2_{Patient_{10}}, e_{undergoseProcedure}, e^2_{Mastectomy}\right) = s_2$$

$$\vdots$$

$$F_{Score}\left(e^n_{Patient_{10}}, e_{undergoseProcedure}, e^n_{Mastectomy}\right) = s_n$$

where $$e^1_{Patient_{10}}, e^2_{Patient_{10}}, \ldots, e^n_{Patient_{10}}$$

are the n different embeddings for "Patient10" and $$e^1_{Mastectomy}, e^2_{Mastectomy}, \ldots, e^n_{Mastectomy}$$

are n different embeddings for "Mastectomy" obtained by doing n forward passes via the encoder by keeping dropouts active during inference time, $e_{undergoesProcedure}$ Procedure is the predicate embedding, and $F_{Score}(e_s, e_p, e_o)$ is the scoring function used by the neural link predictor model (e.g., TransE or ComplEx). Based on the above, the mean and standard deviation of the obtained scores may be calculated, and the mean and standard deviation (Std) are returned as below (see FIG. 7):

$$F_{Score}(<s, p, o>) = \text{Mean}(s_1, s_2, \ldots, s_n) \pm Std(s_1, s_2, \ldots, s_n)$$

The mean represents the predicted plausibility scores, and the standard deviation represents the data and model uncertainty estimate.

In the present disclosure, in some or all embodiments, a knowledge graph may refer to a set of entities and relations (or links) between these entities represented as a graph; a knowledge graph embedding may refer to an optimized set of vectors representing entities and links of a knowledge graph; a link prediction task may refer to a task for predicting plausibility of the missing link in the knowledge graph; a target triple may refer to a statement or fact that is subject to be evaluated for plausibility; a training step may refer to a step when a link prediction sub-system is optimized to source data, for example, the knowledge graph; and/or an inference/production step may refer to a step when an optimized link prediction system is used to predict plausibility of a single or a group of previously not seen links, which may be usually after training is finished.

In the present disclosure, in some or all embodiments, a circuitry may refer to at least one of or any combination of the following: a piece of hardware, a piece of software, a piece of firmware, a plurality of computer-readable instructions, a plurality of computer-readable codes, or other circuitry in any combination. In some or all embodiments, a circuitry may be implemented, for example, with one or more systems on a chip (SoC), application specific integrated circuits (ASIC), microprocessors, discrete analog and digital circuits, memory, flash drivers, etc.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A computing device for quantifying certainty for a prediction based on a knowledge graph, the computing device comprising:

a reception circuitry configured to receive a target triple and a knowledge graph comprising a set of structured data and a set of certainty scores for the structured data;

a knowledge graph embedding generation circuitry configured to convert the target triple to an embeddings space according to neighborhood sampling, wherein the embeddings space includes a set of point coordinates representing the set of structured data in the embeddings space;

a scoring circuitry configured to generate a plausibility prediction for the target triple using a scoring function;

a control circuitry configured to repeat the acts of the knowledge graph embedding generation circuitry and the scoring circuitry N times with dropouts to obtain N plausibility scores for the target triple, wherein N is an integer larger than one; and an output circuitry configured to generate a predicted plausibility score and a certainty score for the target triple based on the N plausibility scores, and output the predicted plausibility score and the certainty score, wherein the output circuitry is configured to generate the predicted plausibility score and the certainty score for the target triple based on the N plausibility scores and output the predicted plausibility score and the certainty score is carried out by:

calculating a mean and a standard deviation based on the obtained N plausibility scores for the target triple;

determining the mean to represent the predicted plausibility score and the certainty score based on the standard deviation; and outputting the predicted plausibility score and the certainty score for the target triple.

2. The computing device according to claim 1, wherein the knowledge graph embedding generation circuitry is configured to convert the target triple to the embeddings space according to the neighborhood sampling, by:

selecting K neighboring nodes of the target triple based on certainty scores of the neighboring nodes, wherein K is an integer larger than one;

generating an embedding vector for each of the K neighboring nodes by an encoder circuitry; and aggregating the K embedding vectors to obtain an aggregated embedding vector for the target triple.

3. The computing device according to claim 2, wherein selecting the K neighboring nodes of the target triple based on certainty scores of the neighboring nodes, is carried out by:

sampling the neighboring nodes of the target triple according to a sampling with replacement algorithm to obtain the K neighboring nodes with highest certainty scores.

4. The computing device according to claim 2, wherein:

the encoder circuitry in the knowledge graph embedding generation circuitry comprises a neural network with dropouts after every weight layer.

5. The computing device according to claim 2, wherein aggregating the K embedding vectors to obtain the aggregated embedding vector for the target triple is carried out by summarizing, averaging or taking the weighted average of the corresponding point coordinate of the K embedding vectors to determine each point of the aggregate embedding vector.

6. The computing device according to claim 1, wherein:

the computer device further comprises, for each triple in a subset of the knowledge graph:

a corruption generation circuitry configured to generate synthetic negatives corresponding to the triple, and a loss circuitry configured to calculate a loss score according to a loss function based on scoring the triple and the synthetic negatives; and the control circuitry is further configured to train the knowledge graph embedding generation circuitry based on the loss score.

7. The computing device according to claim 6, wherein:

the scoring circuitry is configured to generate a positive score for the triple and to generate negative scores for the synthetic negatives using the scoring function; and when the loss circuitry is configured to calculate the loss score, the loss circuitry is configured to calculate the loss score based on the positive score for the triple and the negative scores for the synthetic negatives.

8. A method for quantifying certainty for a prediction based on a knowledge graph, the method comprising:

receiving, by a device comprising a memory storing instructions and a processing circuitry in communication with the memory, a target triple and a knowledge graph comprising a set of structured data and a set of certainty scores for the structured data;

converting, by the device, the target triple to an embeddings space according to neighborhood sampling by a neural network, wherein the embeddings space includes a set of point coordinates representing the set of structured data in the embeddings space;

generating, by the device, a plausibility prediction for the target triple using a scoring function;

repeating, by the device, converting the target triple to the embedding space and generating another plausibility prediction for the target triple N times with dropouts to obtain N plausibility scores for the target triple, wherein Nis an integer larger than one; and generating, by the device, a predicted plausibility score and a certainty score for the target triple based on the N plausibility scores, and outputting for display the predicted plausibility score and the certainty score, wherein generating the predicted plausibility score and the certainty score for the target triple based on the N plausibility scores and outputting the predicted plausibility score and the certainty score comprises:

calculating a mean and a standard deviation based on the obtained N plausibility scores for the target triple;

determining the mean to represent the predicted plausibility score and the certainty score based on the standard deviation; and outputting the predicted plausibility score and the certainty score for the target triple.

9. The method according to claim 8, wherein converting the target triple to the embeddings space according to the neighborhood sampling comprises:

selecting K neighboring nodes of the target triple based on certainty scores of the neighboring nodes, wherein K is an integer larger than one;

generating an embedding vector for each of the K neighboring nodes by an encoder; and aggregating the K embedding vectors to obtain an aggregated embedding vector for the target triple.

10. The method according to claim 9, wherein selecting the K neighboring nodes of the target triple based on certainty scores of the neighboring nodes comprises:

sampling the neighboring nodes of the target triple according to a sampling with replacement algorithm to obtain the K neighboring nodes with highest certainty scores.

11. The method according to claim 9, wherein the encoder in the knowledge graph embedding generation circuitry comprises a neural network with dropouts after every weight layer.

12. The method according to claim 9, wherein aggregating the K embedding vectors to obtain the aggregated embedding vector for the target triple comprises:

summarizing, averaging or taking the weighted average of the corresponding point coordinate of the K embedding vectors to determine each point of the aggregate embedding vector.

13. The method according to claim 8, further comprising:

for each triple in a subset of the knowledge graph:

generating synthetic negatives corresponding to the triple, and calculating a loss score according to a loss function based on scoring the triple and the synthetic negatives; and training the neural network based on the loss score.

14. The method according to claim 13, further comprising:

generating a positive score for the triple and to generate negative scores for the synthetic negatives using the scoring function; and wherein calculating the loss score comprises calculating the loss score based on the positive score for the triple and the negative scores for the synthetic negatives.

15. A non-transitory computer-readable storage medium storing computer-readable instructions, wherein, the computer-readable instructions, when executed by a processing circuitry, are configured to cause the processing circuitry to perform:

receiving a target triple and a knowledge graph comprising a set of structured data and a set of certainty scores for the structured data;

converting the target triple to an embeddings space according to neighborhood sampling by a neural network, wherein the embeddings space includes a set of point coordinates representing the set of structured data in the embeddings space;

generating a plausibility prediction for the target triple using a scoring function;

repeating converting the target triple to the embedding space and generating another plausibility prediction for the target triple N times with dropouts to obtain N plausibility scores for the target triple, wherein N is an integer larger than one; and generating a predicted plausibility score and a certainty score for the target triple based on the N plausibility scores, and outputting for display the predicted plausibility score and the certainty score, wherein generating the predicted plausibility score and the certainty score for the target triple based on the N plausibility scores and outputting the predicted plausibility score and the certainty score comprises:

calculating a mean and a standard deviation based on the obtained N plausibility scores for the target triple;

determining the mean to represent the predicted plausibility score and the certainty score based on the standard deviation; and outputting the predicted plausibility score and the certainty score for the target triple.

16. The non-transitory computer-readable storage medium according to claim 15, wherein, when the computer-readable instructions are configured to cause the processor to perform converting the target triple to the embeddings space according to the neighborhood sampling, the computer-readable instructions are configured to cause the processing circuitry to perform:

selecting K neighboring nodes of the target triple based on certainty scores of the neighboring nodes, wherein K is an integer larger than one;

generating an embedding vector for each of the K neighboring nodes by an encoder; and aggregating the K embedding vectors to obtain an aggregated embedding vector for the target triple.

17. The non-transitory computer-readable storage medium according to claim 16, wherein, when the computer-readable instructions are configured to cause the processor to perform selecting the K neighboring nodes of the target triple based on certainty scores of the neighboring nodes, the computer-readable instructions are configured to cause the processing circuitry to perform:

sampling the neighboring nodes of the target triple according to a sampling with replacement algorithm to obtain the K neighboring nodes with highest certainty scores.

* * * * *